US008543332B2

(12) United States Patent
McQuaide, Jr.

(10) Patent No.: US 8,543,332 B2
(45) Date of Patent: *Sep. 24, 2013

(54) METHODS, DEVICES, AND COMPUTER PROGRAM PRODUCTS FOR GEO-TAGGED PHOTOGRAPHIC IMAGE AUGMENTED FILES

(75) Inventor: Arnold Chester McQuaide, Jr., Berkeley Lake, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/485,998

(22) Filed: Jun. 1, 2012

(65) Prior Publication Data

US 2012/0239292 A1 Sep. 20, 2012

Related U.S. Application Data

(63) Continuation of application No. 13/169,960, filed on Jun. 27, 2011, now Pat. No. 8,204,683, which is a continuation of application No. 11/966,425, filed on Dec. 28, 2007, now Pat. No. 8,019,536.

(51) Int. Cl.
*G01C 21/26* (2006.01)
*G01C 21/34* (2006.01)

(52) U.S. Cl.
USPC ........... 701/431; 701/436; 701/438; 701/454; 701/467; 701/491; 340/995.24

(58) Field of Classification Search
None
See application file for complete search history.

(56) References Cited

U.S. PATENT DOCUMENTS 6,182,010 B1 1/2001 Berstis
6,199,014 B1 3/2001 Walker et al.
6,321,158 B1 11/2001 DeLorme et al.
6,336,073 B1 1/2002 Ihara et al.
6,477,460 B2 11/2002 Kepler
7,155,338 B2 12/2006 Kauvo et al.
7,353,110 B2 4/2008 Kim
7,383,123 B2 6/2008 Park
7,539,572 B2 5/2009 Kamikawa et al.
7,941,271 B2 5/2011 Ofek
7,941,753 B2 5/2011 Meisels et al.
8,019,536 B2 9/2011 McQuaide, Jr.
8,204,683 B2 6/2012 McQuaide, Jr.
8,364,397 B2 * 1/2013 Hamilton, II et al. ........ 701/436

(Continued)

FOREIGN PATENT DOCUMENTS

EP 1767050 3/2007
JP 2002-081951 3/2002

(Continued)

OTHER PUBLICATIONS

Haartsen, "BLUETOOTH—The Universal Radio Interface for Ad Hoc, Wireless Connectivity," Ericsson Review No. 3, 1998, 110-117.

*Primary Examiner* — Michael J Zanelli
(74) *Attorney, Agent, or Firm* — Woodcock Washburn LLP

(57) ABSTRACT

A method of providing augmented Global Positioning System (GPS) navigation can include detecting movement of a GPS enabled mobile device along a navigational route and displaying a photographic image on a display of the GPS enabled mobile device responsive to detecting movement of the GPS enabled mobile device along the navigational route provided by the GPS enabled mobile device. Related devices and computer program products are also disclosed.

11 Claims, 6 Drawing Sheets

605 — Travel a navigational route using the GPS enabled mobile device

610 — Approach a waypoint having a geo-tagged photographic image associated therewith 615 — GPS enabled mobile device comes into proximity with the geographic location associated with the waypoint 620 — Selectively include the geo-tagged photographic image associated with the waypoint on the display of the GPS enabled mobile device, where the geo-tagged photographic image has a navigational route point-of-view perspective 625 — Selectively remove the geo-tagged photographic image associated with the waypoint on the display of the GPS enabled mobile device when no longer proximate to thegeographic location associated with the waypoint

(56) References Cited

U.S. PATENT DOCUMENTS

| | | | |
|---|---|---|---|
| 2003/0164822 | A1 | 9/2003 | Okada |
| 2006/0004512 | A1 | 1/2006 | Herbst et al. |
| 2007/0067104 | A1 | 3/2007 | Mays |
| 2007/0150175 | A1 | 6/2007 | Shen et al. |
| 2007/0150188 | A1 | 6/2007 | Rosenberg |
| 2008/0046175 | A1 | 2/2008 | Tengler et al. |
| 2008/0082264 | A1 | 4/2008 | Hill et al. |
| 2008/0140458 | A1 | 6/2008 | Moore |
| 2008/0167938 | A1 | 7/2008 | Meisels et al. |
| 2008/0300784 | A1 | 12/2008 | Kleinstern et al. |

FOREIGN PATENT DOCUMENTS

| | | |
|---|---|---|
| JP | 2003-227722 | 8/2003 |
| JP | 2004-151063 | 5/2004 |
| JP | 2008-281951 | 11/2008 |
| WO | WO 2005/122636 | 12/2005 |

* cited by examiner

METHODS, DEVICES, AND COMPUTER PROGRAM PRODUCTS FOR GEO-TAGGED PHOTOGRAPHIC IMAGE AUGMENTED FILES

CROSS REFERENCE TO RELATED APPLICATIONS

The instant application claims priority to and is a continuation of U.S. patent application Ser. No. 13/169,960, entitled "Methods, Devices, And Computer Program Products For Geo-Tagged Photographic Image Augmented Files," filed Jun. 27, 2011. U.S. patent application Ser. No. 13/169,960 claims priority to and is a continuation of U.S. patent application Ser. No. 11/966,425 entitled "Methods, Devices, And Computer Program Products For Geo-Tagged Photographic Image Augmented Files," filed Dec. 28, 2007, which has issued with U.S. Pat. No. 8,019,536. U.S. patent application Ser. No. 13/169,960, U.S. patent application Ser. No. 13/169, 960, and U.S. Pat. No. 8,019,536, each are hereby incorporated by reference in their respective entireties.

BACKGROUND

The present invention generally relates to the field of navigation using a Global Positioning System (GPS).

Current GPS navigation systems (such as handheld, vehicle based, or even phone based GPS navigation systems) can provide simplified diagrams and maps with audio information to provide navigational routing for users. Some of these GPS navigation systems also provide labeled waypoints that can correspond to landmarks along the navigational route selected by the user.

One approach to providing routing for users can be provided by Google, which is summarized on the Internet at the following URL gpsreview.net/google-maps-street-view/.

SUMMARY

According to exemplary embodiments, methods, devices, systems, and computer program products are provided for geo-tagged photographic image augmented GPS navigation. Pursuant to these embodiments, a method of providing augmented Global Positioning System (GPS) navigation can include detecting movement of a GPS enabled mobile device along a navigational route and displaying a photographic image on a display of the GPS enabled mobile device responsive to detecting movement of the GPS enabled mobile device along the navigational route provided by the GPS enabled mobile device.

Other systems, methods, and/or computer program products according to exemplary embodiments will be or become apparent to one with skill in the art upon review of the following drawings and detailed description. It is intended that all such additional systems, methods, and/or computer program products be included within this description, be within the scope of the present invention, and be protected by the accompanying claims.

DESCRIPTION OF EMBODIMENTS

Figure 1:
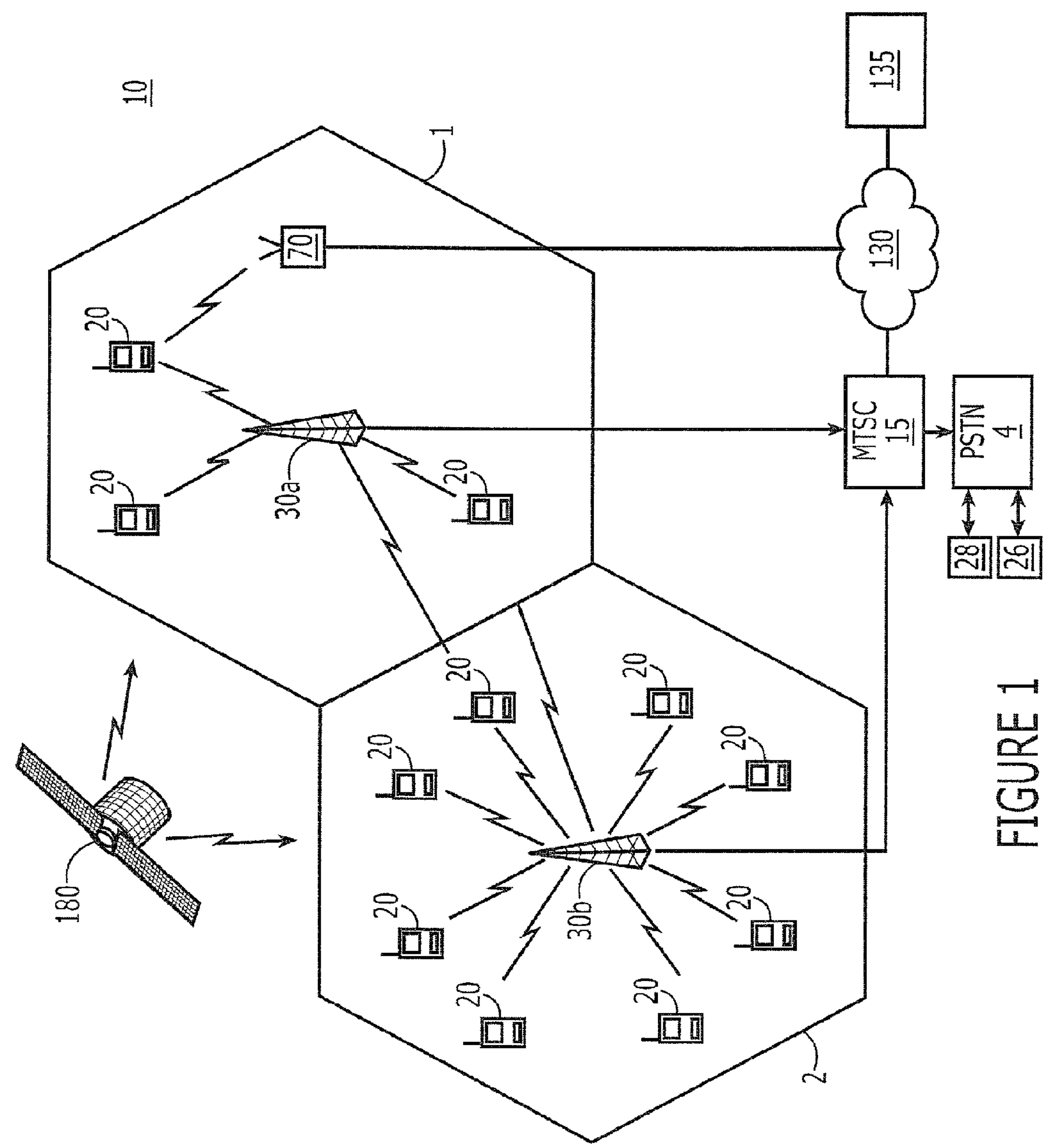
FIG. 1 is a schematic representation of a wireless communication system configured to support GPS enabled mobile devices in some embodiments.

Exemplary embodiments are now described more fully hereinafter with reference to the accompanying figures. This invention may, however, be embodied in many alternate forms and should not be construed as limited to the embodiments set forth herein. Like numbers refer to like elements throughout the description of the figures.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof As used herein the term "and/or" includes any and all combinations of one or more of the associated listed items.

It will be understood that, when an element is referred to as being "coupled" to another element, it can be directly coupled to the other element or intervening elements may be present. In contrast, when an element is referred to as being "directly coupled" to another element, there are no intervening elements present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense expressly so defined herein.

Exemplary embodiments are described below with reference to diagrams (such as schematic illustrations) and/or operational illustrations of methods, devices, and computer program products. It is to be understood that the functions/acts noted in the figures may occur out of the order noted in the operational illustrations. For example, two elements shown in succession may in fact be executed substantially concurrently or the elements may sometimes be executed in the reverse order, depending upon the functionality/acts involved.

The present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM).

Computer program code or "code" for carrying out operations according to the present invention may be written in an object oriented programming language such as JAVA@, Smalltalk or C++, JavaScript, Visual Basic, TSQL, Perl, or in various other programming languages. Software embodiments of the present invention do not depend on implementation with a particular programming language. Portions of the code may execute entirely on one or more systems utilized by an intermediary server.

The computer program code may be provided to a processor of a general purpose computer, special purpose computer, or other programmable data processing apparatus as instructions to produce a machine, such that the instructions, which execute via the processor of the computer or other programmable data processing apparatus, create means for implementing the functions specified in the illustrations.

The computer code may be stored in a computer-readable memory that can direct a computer or other programmable data processing apparatus to function in a particular manner, such that the instructions stored in the computer-readable memory produce an article of manufacture including instruction means which implement the function specified in the illustrations.

As described herein in greater detail, photographic images can be displayed on a GPS enabled mobile device responsive to movement of the GPS enabled mobile device along a navigational route. For example, as the GPS enabled mobile device moves along the navigational route provided on the display, photographic images associated with waypoints along the navigational route can be displayed as the proximity to the waypoint is detected. Accordingly, as a user travels the navigational route, photographic images can be selectively displayed to augment the GPS enabled navigation to allow improved navigation by presenting realistic imagery of waypoints that may be of importance to the user. For example, on the way to a relative's or friend's house, which is not normally traveled by the user, geo-tagged photographic images can be selectively displayed by the GPS enabled mobile device as the user approaches the location (or waypoint). When the photographic image is displayed, the user may be cued to a change in direction or be more assured that the route being traveled is accurate.

In still other embodiments, the images that are selectively included on the display may correspond to an area associated with a destination or waypoint so that the user may become more familiar with the surrounding area before traveling the navigational route. For example, the user may wish to familiarize him/herself with the immediately surrounding area to become more assured that the destination is safe before traveling to the destination.

In still other embodiments, the geo-tagged photographic images selectively included on the display can be generated by the GPS enabled mobile device while operated by the user. For example, the user may be traveling over open terrain or otherwise away from a highway or well traveled route and selectively include the photographic images with associated geographical location information as the user travels the route. Accordingly, when the user wishes to back-track, the photographic images can be selectively included on the display as the user nears the geographic location associated with the geo-tagged photographic image. Accordingly, such selective inclusion of geo-tagged photographic images can assist the user in more accurately navigating the same route previously traveled.

Further, the images selectively included on the display of the GPS enabled mobile device may be provided via links on the GPS enabled device where the geo-tagged photographic images are actually stored on server located on a network accessed via a wireless communications link. Accordingly, if the user desires to see geo-tagged photographic images on the display of the GPS enabled mobile device, a link may be activated and the photographic images associated with the current location, can be fetched from the server. In some embodiments, the geo-tagged photographic images are generated by third parties such as other parties that are included in the same organization or who simply wish to share their geo-tagged photographic images with other users who travel routes including the same waypoints. In further embodiments, the businesses wishing users to visit their location can provide the geo-tagged photographic images for access by the GPS enabled mobile device.

In still further embodiments, businesses and other organizations, e-g., non-profit organizations, can provide geo-tagged photographic images of waypoints that are detours along the navigational route traveled by the user. For example, businesses may provide geo-tagged photographic images of their locations so that a user may access the respective geo-tagged photographic images before traveling the route (i.e., for trip planning purposes). Accordingly, the user may pre-plan their route to visit certain selected locations by the displaying the geo-tagged photographic images on the display, which represent the detour waypoints along the navigational route. The user may more efficiently configure their trip based on the geo-tagged photographic images provided by the businesses. In further embodiments, the geo-tagged photographic images provided by the businesses can be a plurality of geo-tagged photographic images each of which represents a different perspective or view of the location promoted by the business (such as the neighborhood, interior photographic images, etc.).

As used herein, a "GPS enabled mobile device" (sometimes referred to herein simply as a "mobile device") includes a device having a GPS location capability. Further, the mobile device may be configured to communicate via a wireless interface, such as a cellular radiotelephone interface, wireless local area network interface (WLAN), Bluetooth interface, or another Radiofrequency (W) communications interface. A "mobile device" can include for example, a GPS navigation unit, such as a GPS navigation unit integrated into a vehicle, a handheld GPS navigation unit carried by persons traveling on foot, a cell phone with built-in GPS navigation and location capabilities, and an add-on GPS navigation unit (typically used in a vehicle). Other mobile devices include, but are not limited to a personal communication terminal that may combine a cellular mobile device with data processing, facsimile and data communications capabilities; a personal data assistance (PDA) that can include a wireless transceiver, pager, Internet/intranet access, local area network interface, wide area network interface, Web browser, organizer, and/or calendar; and a mobile or fixed computer or other device that includes a wireless transceiver.

Mobile devices according to embodiments may be configured to communicate via a cellular communication link that may include a protocol such as, for example, ANSI-136, Global Standard for Mobile (GSM) communication, General Packet Radio Service (GPRS), enhanced data rates for GSM evolution (EDGE), code division multiple access (CDMA), wideband-CDMA, CDMA2000, and UMTS. Communication protocols as used herein may specify the information communicated, the timing, the frequency, the modulation, and/or the operations for setting-up and/or maintaining a communication connection. Although the mobile devices shown in FIG. 1 are depicted as the same type of device and are each referenced with numeral 20, it should be appreciated that the mobile devices may be implemented with any number of different types of devices having the capabilities described above.

Embodiments may also be used in celestial communications systems, such as satellite communications systems. The celestial wireless communication system may be employed to perform similar functions to those performed by the wireless communications networks described herein. In particular, the celestial wireless communications system may include one or more satellites that serve as relays or transponders between one or more earth stations and (satellite) mobile devices. The satellites may communicate with the satellite mobile devices and earth stations via duplex communication links. Each earth station may, in turn, be connected to a Public Switched Telephone Network, thereby allowing communications between the satellite mobile devices, and other terminals included in any other system with which the celestial wireless communication system is integrated. The celestial wireless communication system may utilize a single antenna beam covering the entire geographic region served by the system or the celestial wireless communication system may be designed such that it produces multiple overlapping or non-overlapping beams that serve different sub-regions of the entire geographic region served by the celestial wireless communications system. The satellites and the respective sub-regions may serve a function similar to that of the base stations and the associated cells in a typical terrestrial wireless communications network.

According to FIG. 1, a plurality of mobile devices 20 can communicate with each other in a wireless communications network 10 via a Mobile Telephone Switching Center (MTSC) 15. The mobile devices 20 can also communicate with other terminals, such as terminals 26,28, via a Public Service Telephone Network (PSTN) 4 that is coupled to the network 10.

The wireless communications network 10 is organized as cells 1-2 that collectively can provide service to a geographic region. In particular, each of the cells 1-2 can provide service to associated sub-regions included in the geographic region covered by the network 10. More or fewer cells can be included in the network 10, and the coverage area for some of the cells in the network 10 may overlap one another. Base stations 30*a*-*b* in the cells 1-2 provide wireless communications between each other and the mobile devices 20 located in the geographic region of the cell to allow for communications between the mobile devices 20 and/or the terminals 26,28 in the PSTN 4.

Each of the base stations 30*a*-*b* can transmit/receive data to/from the mobile devices 20 over an associated control channel. For example, the base station 30*a* can communicate with the mobile devices 20 located in cell 1 over associated control channels (not shown). The control channels can be used to page the mobile devices 20 in response to calls directed thereto or to transmit traffic channel assignments to the mobile devices 20 over which a call associated therewith is to be conducted. The control channels can be identified using control channel numbers or identifiers. For example, the mobile devices 20 can store a channel number that identifies the control channel on which it is currently camping.

As described herein, the mobile devices 20 can be GPS enabled devices that can display navigational routes to users. In particular, the mobile devices 20 are capable of determining respective mobile device geographic location information that describes the geographic location of the mobile devices 20 using GPS signals provided by a Global Positioning System (GPS) 180. In some embodiments, the mobile devices 20 can use the GPS signals to determine their respective geographic locations. It will be understood that the single satellite shown in FIG. 1 represents the GPS 180, which can include a constellation of GPS satellites. It will be understood that in some embodiments, the mobile device geographic location can be determined based on other types of location systems such as GALILEO and GLONASS.

As shown in FIG. 1, the mobile devices 20 can access a network 130 (such as the Internet) via the MTSC 15 or, alternatively via a local wireless network 70, such as an IEEE 802.11 network or ad hoc Bluetooth™ compliant network, that is coupled to the network 130. As used herein, an "ad hoc" protocol network or transmitter refers to one that is generally configured at the time of use based on the resources available. Such networks, typically, provide a service discovery protocol to allow, for example, identification of available resources. They may also negotiate various aspects of operations, such as peer relationships between resources, at the time of use of the resources.

As understood by those skilled in the art, Bluetooth™ is directed to providing a relatively robust high-speed wireless connection with low-power consumption and a low-cost architecture. Bluetooth™ technology may provide a universal radio interface in the 2.45 GHz frequency band to enable portable electronic devices to connect and communicate wirelessly via short-range ad hoc networks. Bluetooth™ technology is generally targeted towards the elimination of wires, cables, and connectors between such devices and systems as cordless or mobile phones, modems, headsets, personal digital assistants (PDAs), computers, printers, projectors, and local area networks. The Bluetooth™ interface is further described in an article authored by Jaap Haartsen entitled Bluetooth—*The universal radio interface for ad hoc, wireless connectivity*, Ericsson Review, No. 3, 1998, which is hereby incorporated herein by reference in its entirety.

Still referring to FIG. 1, a server 135 can store geo-tagged photographic images for access by the mobile devices 20, for example, in a database. The geo-tagged photographic images are associated with geographical location information that identifies a location depicted by the photographic images. In some embodiments, the geo-tagged photographic images are provided by users of the mobile devices 20 or by businesses that may wish the users to access their photographic images for display on the mobile devices 20 in providing navigational routing.

In still other embodiments, the server 135 can also provide navigational routing responsive to the GPS location information provided by the mobile device 20. For example, the mobile device 20 may provide geographical location information to the server 135 indicating the approximate geographic location of the mobile device 20 and a destination. In response, the sewer 135 can provide navigational routing to the mobile device 20 to the destination. The server 135 may also provide the geo-tagged photographic images associated with the navigational route as the mobile device 20 moves along the navigational route. Accordingly, the mobile device may be relieved of generating a navigational route, but may instead off-load the generation of the navigational route to the server 135 (or other system).

Figure 2:
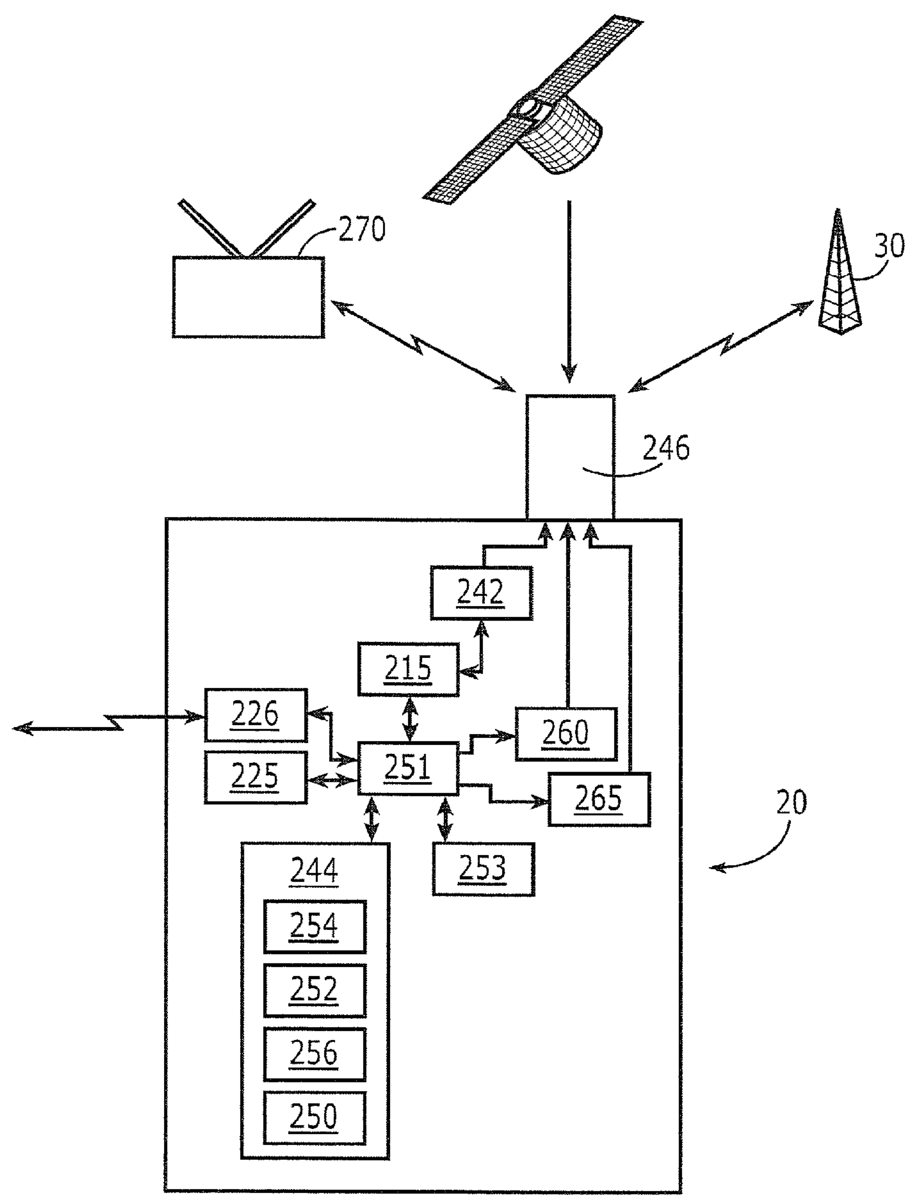
FIG. 2 is a block diagram illustrating GPS enabled mobile devices in some embodiments.

FIG. 2 is a block diagram that illustrates embodiments of mobile stations 20. As illustrated in FIG. 2, the mobile station 20 includes a transceiver circuit 242 that is operative to transmit and receive radio frequency communication signals to the network 10 via an antenna system 246. The antenna system 246 may include an antenna feed structure and one or more antennas.

As those skilled in the art will appreciate, a transmitter portion of the transceiver 242 converts the information, which is to be transmitted by the mobile station 20 into electromagnetic signals suitable for radio communications. A receiver portion of the transceiver 242 demodulates electromagnetic signals, which are received by the mobile station 20 from the network 10 to provide the information contained in the signals in a format, which is understandable to the user.

A user interface 244 of the mobile station 20 may include a variety of components, such as a display 254, a keypad 252, a speaker 256, and a microphone 250, operations of which are known to those of skill in the art. It will be understood that the functions of keypad 252 and the display 254 can be provided by a touch screen through which the user can view information, such as computer displayable documents, provide input thereto, and otherwise control the mobile station 20. It will be understood by those skilled in the art that computer displayable documents (or Web pages) can be, for example, hypertext documents, which can include text, images, input fields, output fields, and a variety of other objects.

A processor circuit 251 can provide for overall operation of the mobile station 20 including coordination of communications via the transceiver circuit 242, the user interface 244, and other components and systems included in the mobile station 20. For example, the processor circuit 251 can provide communications signals to the transceiver circuit 242 when the user speaks into the microphone 250 and receives communications signals from the transceiver 242 for the reproduction of audio through the speaker 256. The processor circuit 251 can generate characters for display on the display 254. For example, the processor circuit 251 can generate numbers for display when the user enters a telephone number on the keypad 252. The characters can also be generated by a character generator circuit, which is not shown. The processor circuit 251 may also provide image processing capabilities to enable retrieving and display a photographic image stored in a digital format such as .jpg.

A GPS location circuit 260 is coupled to the processor circuit 251, and is configured to determine a geographic location for the mobile station 20. It will be understood that although the operations discussed above are described as being carried out by the processor circuit 251, these operations may alternatively be carried out by specialized circuitry and/or software located outside the processor circuit 251 (such as such circuitry located within the GPS location circuit 260 itself). In some embodiments, a camera 226 is coupled to the processor circuit 251 and can operate under control of the user to selectively include photographic images associated with waypoint locations viewed by the camera. In some embodiments, the camera 226 can provide video photographic images and/or still photographic images.

Referring again to FIG. 2, the processor circuit 251 may be implemented using a variety of hardware and software. For example, operations of the processor circuit 251 may be implemented using special-purpose hardware, such as an Application Specific Integrated Circuit (ASIC) and programmable logic devices such as gate arrays, and/or software or firmware running on a computing device such as a microprocessor, microcontroller or digital signal processor (DSP). The processor circuit 251 may provide digital signal processing operations such as scanning for an acceptable control channel, camping on a control channel (including maintaining synchronization with the base station that communicates with the mobile station 20), Voice Activated Dialing (VAD) services, and the like.

A memory 253 can store computer program instructions that, when executed by the processor circuit 251, carry out the operations described herein and shown in the figures. The memory 253 can be non-volatile memory, such as EEPROM (or flash memory), that retains the stored data while power is removed from the memory 253. In some embodiments, the memory 253 can store geo-tagged photographic images generated by the mobile device 20 (via the camera 226) or uploaded from the server 135 and stored locally in the memory 253.

The mobile station 20 further includes a local wireless interface circuit 265 that can provide communication with the local wireless network (as discussed above). In some embodiments, the local wireless interface circuit 265 is a WLAN compliant interface or a Bluetooth compliant interface. Accordingly, the local wireless interface circuit 265 can be used to access geo-tagged photographic images on the server 135 via the local wireless network 70. Alternatively, the geo-tagged photographic images can be accessed from the memory 253.

Figure 3:
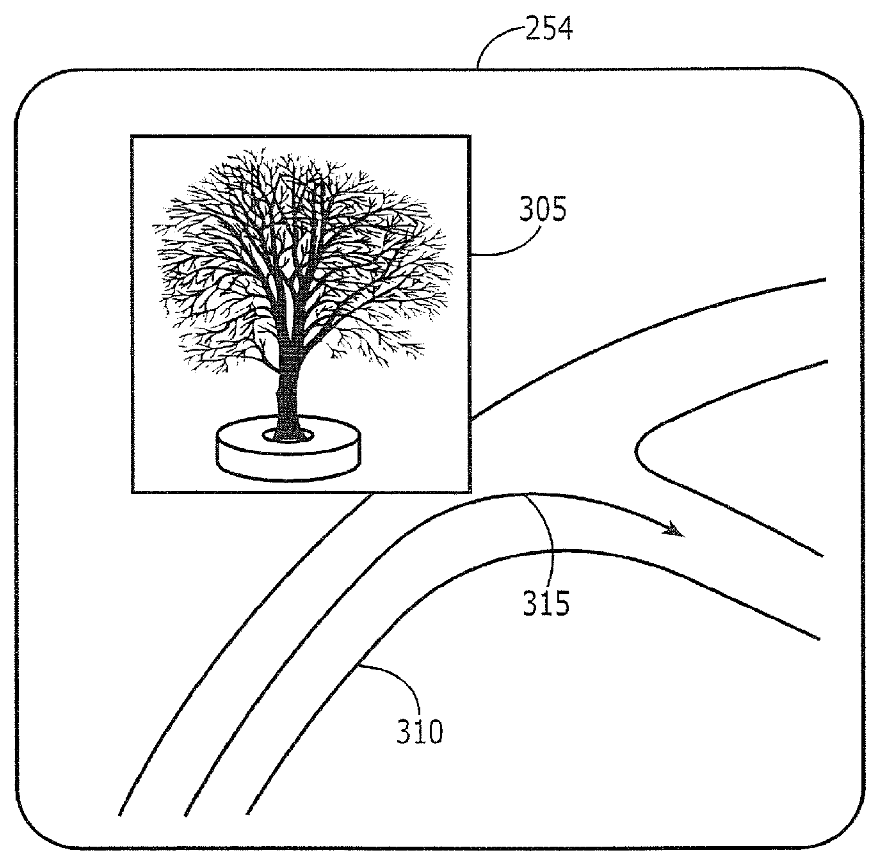
FIG. 3 is a schematic representation of a display of a GPS enabled mobile device configured to selectively display a photographic image responsive to movement of the GPS enabled mobile device along a navigational route in some embodiments.

FIG. 3 is a schematic illustration of the display 254 of a GPS enabled mobile device showing a selectively included photographic image 305 in some embodiments. In particular, the geo-tagged photographic image 305 is selectively included on the display 254 responsive to determining proximity to a waypoint 315 associated with a navigational route 310. The user of the GPS enabled mobile device can select a destination that generates the navigational route 310, which includes a change in direction at the waypoint 315. As the GPS enabled mobile device approaches the waypoint 315, the geo-tagged photographic image 305 that is associated with the waypoint 315 is selectively included on the display 254 to assist the user in more accurately locating the change in direction associated with the waypoint 315. For example, if the user is unfamiliar with the navigational route 310, the user may not be certain as to the exact location of the waypoint 315, which calls for the change in direction. Accordingly, the geo-tagged photographic image 305 is selectively included on the display 254 to assist the user in accurately identifying the change in direction associated with the waypoint 315 to reduce the likelihood that the user will stray from the navigation route 310. Similarly, in some embodiments the user may be able to select waypoints along a planned route and preview associated images prior to approaching them.

According to FIG. 3, the geo-tagged photographic image 305 has a navigational route point of view perspective, which can assist the user in correctly identifying the waypoint 315 associated with the change in direction. In particular, the navigational route point of view perspective can be the way in which the objects shown in the geo-tagged photographic image 305 appear to the user when viewed from the perspective of the navigational route, such as when traveling on a street surface in the direction of the navigational route 315. For example, the geo-tagged photographic image 305 shown in FIG. 3 can show the objects therein to have the navigational route point of view perspective to match the view that would be seen by a user traveling along the road identified by the navigational route 310. In contrast, top down views (such as those viewed from the satellite perspective) may not be as useful in guiding the user along the navigational route 310 as those views are not provided from the perspective of the user along the navigational route 310. The navigational route point of view perspective of the geo-tagged image 305 may assist the user in traveling the navigational route 310 more accurately. Accordingly, when the user views the actual scene including the objects included in the geo-tagged photographic image 305 the user may more readily recognize the proximity of the waypoint 315 and therefore, recognize the change in direction associated with the navigational route 310 at the waypoint 315.

It will be understood that the geo-tagged photographic images can have geographic location information associated therewith, which is generated as the GPS enabled mobile device moves. For example, as the GPS enabled mobile device moves along the navigational route 310 approaching the waypoint 315, the mobile device can compare the current geographic location to waypoints along the navigational route 310. As the geographic information identifying the location of the GPS enabled mobile device becomes more proximate to the location of the waypoint 315, the GPS enabled mobile device can selectively include the photographic image 305 associated with the waypoint 315. Furthermore, as the GPS enabled mobile device moves beyond the waypoint 315, the photographic image 305 formerly included on the display 205 can be removed. It should be noted that in some embodiments the images may be displayed directly or by made available via icons indicating that images associated with certain waypoints are available for viewing by selecting the icon, e.g., via a touch sensitive screen on the device.

It will be understood that the photographic image 305 can be accessed from the local memory 253 within the GPS enabled mobile device, or alternatively, can be accessed over a wireless communications link and retrieved from, for example, the server 135 located accessed by the Internet 130 as shown in FIG. 1. Accordingly, the photographic images may either be stored internally in the GPS enabled mobile device or may be accessed remotely once the proximity to the waypoint 315 is determined Furthermore, images associated with other waypoints located on the navigational route 310 can be pre-fetched in anticipation of the GPS enabled mobile devices movement toward those subsequent waypoints.

In still further embodiments, the photographic images identified for selective inclusion in display 254 can be provided via links provided on the display.

Accordingly, the user can selectively include the photographic image on the display 254 by activating this link. For example, as the GPS enabled mobile device approaches the waypoint 315, a link or icon representing the link may appear on the screen 254 so that the user may select the image for inclusion on display. If the user elects not to include the photographic image 305 on the display, the link may be ignored. Alternatively, if the user wishes to selectively include the photographic image 305 on the display 254, the link can be activated (for example, using a touch screen) whereupon the photographic image 305 is fetched from the local memory or the remote server 135 for selective inclusion on the display 254.

In still other embodiments, the geo-tagged photographic images 305 can be provided on the server or within the GPS enabled mobile device by third parties, such as friends, or businesses that have generated the geo-tagged photographic images 305 for use by others. For example, other users who have traveled the same navigational route 310 may have acquired the geo-tagged photographic images 305 associated with the waypoint 315. Therefore, as a subsequent user approaches the waypoint 315, the geo-tagged photographic images 305 generated by the third parties may be selectively included on the display 254 even though the user may be unaware that the geo-tagged photographic images 305 associated with the waypoint 315 exist until they are included on the display 254.

Figure 4:
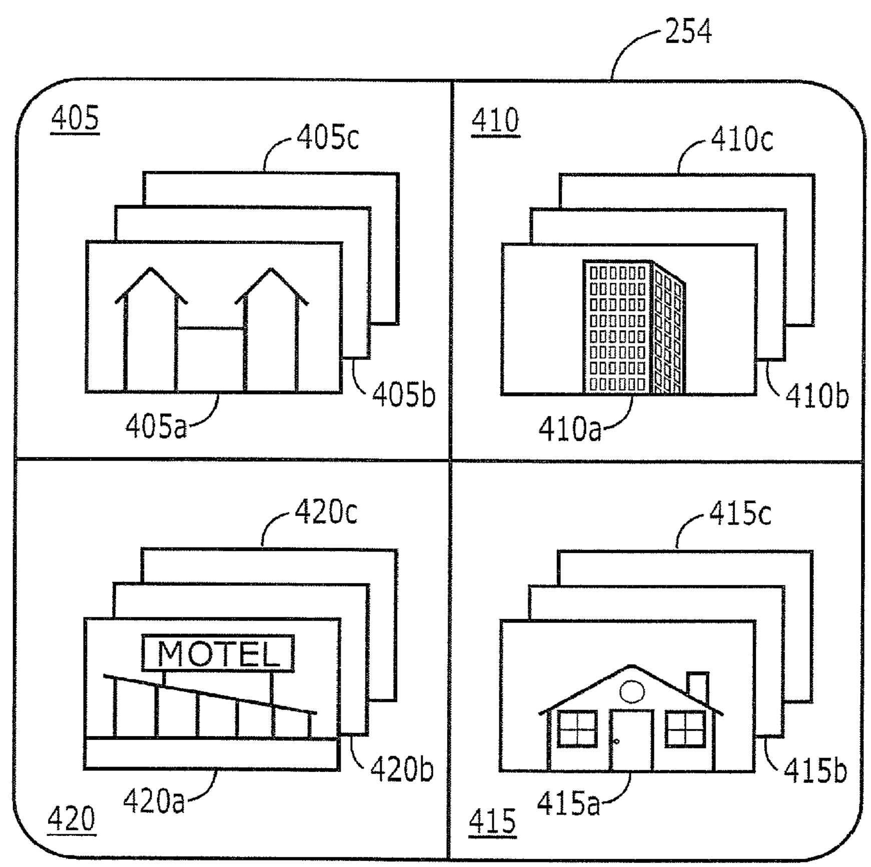
FIG. 4 is a schematic representation of a display of a GPS enabled mobile device configured to selectively include photographic images in response to determined proximity of the GPS enabled mobile device to waypoints along the navigational route in some embodiments.

FIG. 4 is a schematic representation of the display 254 of the GPS enabled mobile device including optional detour waypoints along the navigational route 310, which may be selected as a destination by the user. The optional detour waypoints 405,410,415, and 420 shown on the display 254 can be selected for inclusion on the display 254 prior to the user approaching the respective geographic location associated with each of the optional detour waypoints 405, 410, 415, and 420. For example, a user traveling the navigational route 310 may specify a search of a database (provided by the server 135) of photographic images of the detour waypoints determined to be within proximity of a portion of the navigational route 310. For example, the navigational route may extend for a substantial distance, which may entail a potential overnight stay by the user along the navigational route 310. Accordingly, the user can specify a search of the database of photographic images, which includes views of the subjects of the optional detour waypoints determined to be within the proximity of a further portion of the navigational route 310 (such as within two (2) miles of the navigational route 310. Further, each of the optional detour waypoints 405, 410, 415 and 420 can be selectively included on the display 254 based on the criteria provided in the search by the user. For example, the user may specify a certain brand of hotel or a certain price range or a combination, which may be used as a criteria for selecting the photographic images for display. It should be noted that the actual images may be presented for selection as depicted in FIG. 4 or they may be represented by icons displayed adjacent to the navigational route.

As further shown in FIG. 4, the optional detour waypoints 405,410, 415 and 420 each show respective views of the optional detour waypoints. In particular, the optional detour waypoint 405 may show what is commonly referred to as an extended stay hotel in a perspective 405*a*. Further, the optional detour waypoint 410 may show a major hotel chain located along the same navigational route 310, but accessed by a different exit off the highway, according to a perspective 410*a*. Still further, the optional detour waypoint 415 can be shown using a photographic image of perspective 415*a*, which also approximates the navigational route point of view perspective associated with a low budget off brand hotel, which satisfies the search criteria provided by the user. Accordingly, the user may determine that the optional detour waypoint 415 shown in the photographic image 415*a* is unacceptable and may therefore determine that the optional detour waypoint 415 is not to be taken. Further, the optional detour waypoint 420 can show a low budget motel in the photographic image perspective 420*a* shown from the navigational route point of view perspective of the user upon approach thereto. The user may select the desired optional detour waypoint among the ones selected for inclusion on the display 254.

Further, secondary photographic images 405*b-c*, 410*b-c*, 415*b-c* and 420*b-c* may show alternative views of the same optional detour waypoint shown in the main image perspective (i.e., 405*a*-420*a*). These secondary photographic images may reflect the area in which the optional detoured waypoint is located, or may be further detailed images regarding the types of accommodations or facilities associated with the optional detour waypoint 405-420. Accordingly, the user may also select these images from the display 254. The user can select these images for inclusion before leaving the navigational route 310.

In still other embodiments, as shown in FIG. 4, the optional detour waypoints 405, 420 can be selectively included in the display prior to actual departure by the user along the navigational route 310. For example, the user may specify a search of the database on server 135 for optional detour waypoints along the preplanned navigational route which may fulfill a particular objective specified by the user, such as the existence of a particular type of business or a business offering a particular type of service, such a service for a particular automobile.

Figure 5:
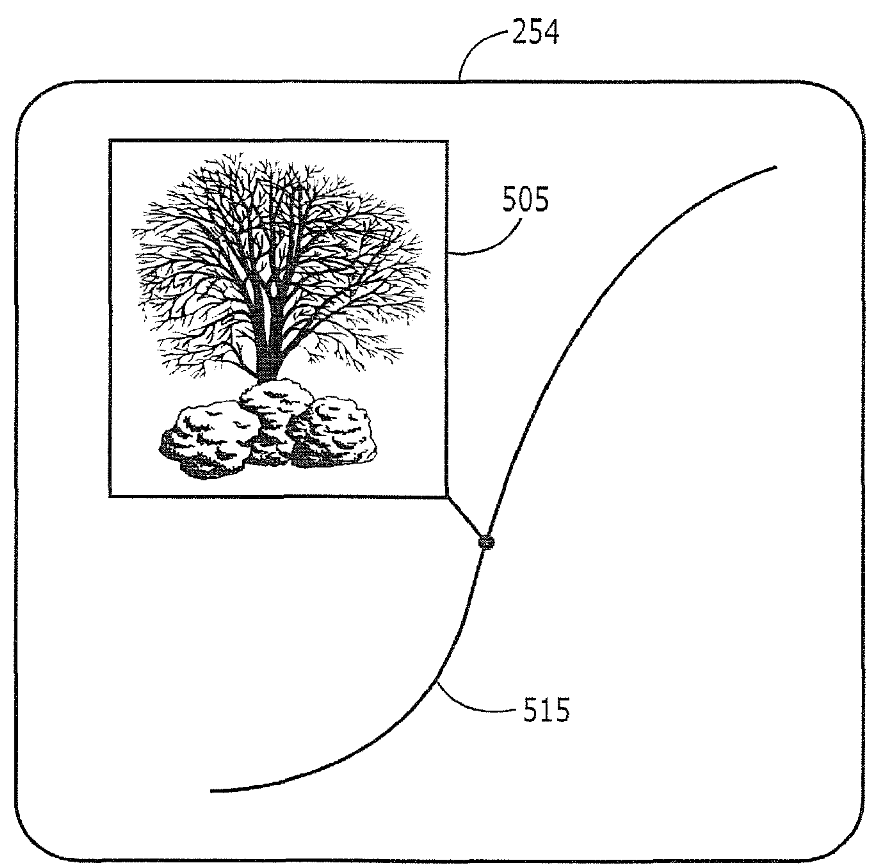
FIG. 5 is a schematic representation of a display of a GPS enabled mobile device configured to selectively include photographic images of views associated with waypoints as seen by a user of the mobile device while traveling a navigational route in some embodiments.

FIG. 5 is a schematic illustration of the display 254 on a GPS enabled mobile device used for traveling a navigational route 515, which is located, for example, off a well traveled road. According to FIG. 5, a geo-tagged photographic image 505 can be selectively included on the display 254 as a user approaches a geographical location associated therewith along the navigational route 515. For example, the navigational route 515 can be located in a rural or relatively untraveled area in which the user may require assistance in following the navigational route 515. In some embodiments, the photographic image 505 may be selectively included on the display 254 as the user approaches the geographical location associated therewith along the navigational route 515. Accordingly, the user may more readily confirm that the navigational route 515 is in fact being traveled when viewing the photographic image 505 on the display 254 and matching the objects located therein to actual objects viewed from the corresponding waypoint associated with the photographic image 505.

Furthermore, the photographic image 505 may also be selectively included on the display 254 as the user travels the navigational route 515 in the reverse direction and on the proper side of the route to confirm that the user is backtracking the navigational route 515 correctly and is more than likely to arrive at the point of origin along the navigational route 515. As described above, the photographic image 505 can be accessed from either the memory of the GPS enabled mobile device including the display 254 or accessed via a wireless communications link to the server 135 located on the internet 130. The photographic images 505 may be captured by the GPS enabled mobile device itself (or associated camera) or may have been captured by others traveling the same navigational route 515. In some embodiments, the photographic images include a timed series of photographic images to provide video in any of the cases described herein rather than still photographic images. Accordingly, the term "photographic image" will be interpreted to include video images as well as still images. In this way, video images 505 can be selectively included on the display in response to the proximity of the waypoint.

As described herein, the GPS enabled mobile device may be, for example, a cellular radio telephone including a GPS location circuit that enables the cellular radio telephone to determine a proximate geographic location for the cellular radio telephone. In other embodiments, the GPS enabled mobile device can be an integrated GPS navigation unit included in a vehicle, such as an automobile. In still further embodiments, the GPS enabled mobile device may be a handheld GPS enabled navigational unit which displays maps and contours of terrain, the type of which is commonly used to travel in rural or mountainous areas.

In still other embodiments, the GPS enabled mobile device can use the camera 226 in FIG. 2 to acquire images associated with the waypoints to be geo-tagged by the GPS enabled mobile device and stored therein or uploaded to the server 135 via the wireless communications link. For example, the camera 226 can be used to acquire an image of a scene that is to be associated with a waypoint traveled by the user. In turn, the acquired photographic image is geo-tagged using the GPS location circuit 260 included in the GPS enabled mobile device and can be either stored in the memory 253 or uploaded to the server 135 on the internet 130. Accordingly, other travelers along the same or similar navigational route 310 can access the geo-tagged photographic images acquired by the camera 226 upon the proximity of those respective GPS enabled mobile devices becoming proximate to the geographic location information associated with the image acquired by the camera 226.

In still further embodiments, the geo-tagged photographic image acquired by the camera 226 may be protected by the user of the GPS enabled mobile device so that only authorized other users may selectively include that photographic image on the display 254 of their respective GPS enabled mobile device (such as family members, or other club members traveling the same navigational route). In still other embodiments, the user of the GPS enabled mobile device may transmit the geo-tagged photographic image directly to the other users who have traveled the same navigational route traveled by the user who acquired the geo-tagged photographic image. For example, the geo-tagged photographic image can be included in MMS or SMS type message to another traveler along the same navigational route so that the subsequent traveler may more accurately follow the navigational route to meet the users who acquired the photographic image used in the camera 226.

Figure 6:
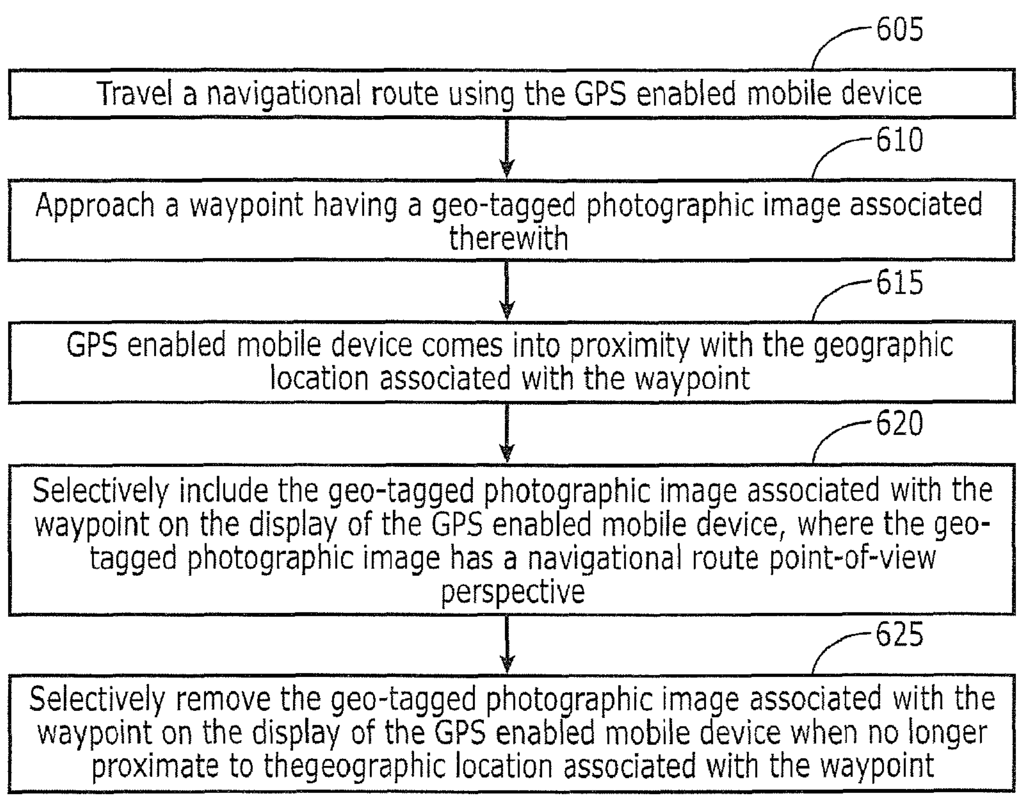
FIG. 6 is a flowchart that illustrates operations of a GPS enabled mobile device in some embodiments.

FIG. 6 is a flowchart that illustrates operations of GPS enabled mobile devices in some embodiments. According to FIG. 6, a user travels a navigational route using the GPS enabled mobile device (Block 605). As the GPS enabled mobile device approaches a waypoint having a geo-tagged photographic image associated therewith (Block 610). The GPS enabled mobile device comes into proximity with the geographic location associated with the waypoint (Block 615).

Once proximity to the geographic location associated with the waypoint is determined, the geo-tagged photographic image can be selectively included on the display of the GPS enabled mobile device, where the geo-tagged photographic image has a navigational route point of view perspective (Block 620). Once the GPS enabled mobile device is no longer within proximity of the waypoint, the geo-tagged photographic image associated with the waypoint can be selectively moved from the display (Block 625).

As described herein, photographic images can be displayed on a GPS enabled mobile device responsive to movement of the GPS enabled mobile device along a navigational route. For example, as the GPS enabled mobile device moves along the navigational route provided on the display, photographic images associated with waypoints along the navigational route can be displayed as the proximity to the waypoint is detected. Accordingly, as a user travels the navigational route, photographic images can be selectively displayed to augment the GPS enabled navigation to allow improved navigation by presenting realistic imagery of waypoints that may be of importance to the user. For example, on the way to a relative or friend's house, which is not normally traveled by the user, geo-tagged photographic images can be selectively displayed by the GPS enabled mobile device as the user approaches the location (or waypoint). When the photographic image is displayed, the user may be cued to a change in direction or be more assured that the route being traveled is accurate. Although various embodiments have been described above with respect to photographic images, it will be understood that other types of images, such as virtual images, can also be used in accordance with further embodiments.

Many alterations and modifications may be made by those having ordinary skill in the art, given the benefit of present disclosure, without departing from the spirit and scope of the invention. Therefore, it must be understood that the illustrated embodiments have been set forth only for the purposes of example, and that it should not be taken as limiting the invention as defined by the following claims. The following claims are, therefore, to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

What is claimed:

1. A tangible computer-readable storage medium having executable instructions stored thereon, the executable instructions, when executed by a processor, cause the processor to effectuate operations comprising:

responsive to determining that a mobile device is within proximity to subjects of waypoints along a navigational route of the mobile device:

searching, using search parameters provided by the mobile device, a database of photographic images of views of subjects of waypoints determined to be within proximity of the navigational route of the mobile device; and selecting ones of found photographic images for display on the mobile device; and displaying a photographic image of the ones of found photographic images on a display of the mobile device responsive to movement of the mobile device along a navigational route, the displayed photographic image having a navigational route point-of-view perspective as seen by a user of the mobile device while traveling the navigational route, wherein at least one of the found photographic images comprises a detour waypoint along the navigational route offered for selection prior to leaving the navigational route.

2. The computer-readable storage medium of claim 1, the operations further comprising acquiring a photographic image for display via a camera on the mobile device.

3. The computer-readable storage medium of claim 1, the operations further comprising receiving a photographic image for display via a wireless link to a database of photographic images on a network that is remote from the mobile device.

4. The computer-readable storage medium of claim 1, the operations further comprising:

facilitating the mobile device traveling the navigational route in reverse order by displaying on the mobile device, photographic images of the ones of found photographic images in reverse order.

5. The computer-readable storage medium of claim 4, wherein the photographic images provided in reverse order are formatted as video comprising a timed series of the photographic images.

6. A method comprising:

displaying a photographic image on a display of a mobile device responsive to movement of the mobile device along a navigational route provided by the mobile device, the displaying comprising selectively including the photographic image on the display responsive to determining proximity of the mobile device to the navigational route, the photographic image having a navigational route point-of-view perspective as seen by a user of the mobile device while traveling the navigational route on a surface; and displaying another photographic image comprising a detour waypoint along the navigational route, the detour waypoint offered for a user selection prior to leaving the navigational route.

7. The method of claim 6, wherein selectively including comprises acquiring the photographic image via a camera for display on the mobile device.

8. The method of claim 6, wherein selectively including comprises receiving the photographic image via a wireless link to a database of photographic images on a network that is remote from the mobile device.

9. The method of claim 6, wherein selectively including further comprises:

searching a database of photographic images of views of subjects of waypoints determined to be within proximity of the navigational route to provide found photographic images; and selecting at least one of the found photographic images for display in response to determining that the mobile device is within proximity to the subjects of the waypoints along the navigational route.

10. The method of claim 9, wherein searching the database comprises receiving search parameters input from a user of the mobile device.

11. The method of claim 9, wherein the at least one of the found photographic images comprises options for detour waypoints along the navigational route offered for selection prior to leaving the navigational route.

* * * * *